Patented Oct. 22, 1935

2,017,889

UNITED STATES PATENT OFFICE 2,017,889

LIGHT WEIGHT AGGREGATES AND METHOD OF MAKING THE SAME

Carrell W. Bowyer, Highland, Ind.

No Drawing. Application July 29, 1932,
Serial No. 626,238

9 Claims. (Cl. 49—77.5)

This invention relates to light weight aggregate for use in concrete, and particularly to aggregates made from blast furnace slag or the like. The blast furnace product known as water granulated slag has been used to some extent as a concrete aggregate for making cement blocks, but the material is not entirely satisfactory, partly because its density is too great, and partly because the resulting concrete has not sufficient strength in proportion to its weight. For these reasons the material has never been successful for use in reinforced concrete structures.

A material known as "pop corn" slag or "rock sponge" has also been developed for certain uses, particularly in non-structural concrete where high insulating value and high sound deadening qualities are required. This material has a large number of entrapped cells and is very light in weight, but it has not sufficient structural strength to adapt it for use as an aggregate in structural concrete.

Clean anthracite cinders have been used to a certain extent in certain parts of the country as a concrete aggregate, but these have not sufficient strength to give complete satisfaction and moreover cinders are likely to contain acids which will cause corrosion of the reinforcing steel or other metal such as pipes and conduit which it is apt to contact.

It is an object of this invention to produce a new and improved light weight concrete aggregate which will have sufficient strength to adapt it for use in structural concrete for reasonable loadings and spans and which will have a minimum weight per unit volume.

It is a further object of this invention to produce a new and improved light weight aggregate which may be made from waste products and particularly blast furnace slag.

Other objects will appear from the following description and accompanying claims:

In the practice of my invention I take "rock sponge" in the form of granules of any suitable size and apply heat to it in any suitable manner to raise it to a temperature just below the melting point. This may be done by placing the material in a furnace, rotary kiln, on a large grate, or in any other suitable manner. The application of heat is discontinued when the surfaces of the particles have been partially glazed and before the minute air cells which permeate the "rock sponge" have had an opportunity to run together and permit the air to escape. The porosity of the rock sponge is somewhat reduced in this manner and its natural strength is greatly increased, but it should be clearly understood that the material is not to be completely melted.

The purest and cleanest product will naturally be produced by applying heat from an exterior source to the "rock sponge", but satisfactory results for most purposes may also be obtained by mixing the "rock sponge" with a sufficient amount of any low grade fuel, such for instance as coke breeze, to develop the necessary heat for partially fusing or sintering the mixture. This may be done by mixing the "rock sponge" and fuel, placing the mixture in a layer from 2 to 12 inches deep on a large grate or in a furnace, or it may be placed in a rotary kiln or sintering machine. The fuel in the mixture is ignited by any suitable means and the temperature is thereby raised to a point at which the "rock sponge" and slag are partially fused or bonded together. It will be understood, of course, that the materials are not completely fused or melted but merely sintered together. During this process the clinker and ash from the coke breeze or other fuel attaches itself to the granules of the rock sponge and has a tendency to form a coating over the granules as well as a bonding material attaching them together. As the fuel is burned out the material is allowed to cool and is then broken up to the proper size for use in the proposed concrete structure. While granulated slag is not satisfactory for use as a concrete aggregate, its qualities for such use may be greatly improved by this process and due to the availability of this material in large quantities, I prefer to mix the slag with the "rock sponge" in proportions up to 50% of the granulated slag and 50% of the "rock sponge."

Briefly stated, the method of producing rock sponge is as follows:

Ordinary blast furnace slag is subjected to a stream of water under pressure as it is drawn from the blast furnace. The quantity of water used is preferably just that amount which will be turned into steam, at least momentarily, as it contacts with the slag. The material is then drained and preferably dried and is ready for use. The stream or jet of water strikes against the stream of molten slag as it falls from the tap hole or other outlet, and the force of the water jet breaks up the slag into small chunks. Careful distinction should be made between the regulation of the quantity of water supplied, and the force or pressure. The quantity is so regulated as to cool the slag just rapidly enough to permit the occluded gases to form bubbles and thereby expand the slag to the desired extent, or to the largest volume it is capable of attaining, and to lower its temperature below the melting point the instant the desired expansion point is reached, so as to prevent the joining of the bubbles to such an extent as to permit the gases to escape, and thereby permit the slag to re-contract. If the slag is cooled too slowly, a hard cinder-like material of high density, similar to air cooled slag, is formed.

The force or pressure of the water jet is so regulated as to break up the cooling slag into particles or chunks of the proper size. It will readily be understood that particles of smaller size may be produced by increasing the pressure, and vice versa.

The granulated slag is produced by applying larger quantities of water to the molten slag as it issues from the blast furnace or by letting the molten slag drop directly into a large container of water.

In the manufacture of the material according to my invention, either the rock sponge or the granulated slag could be used alone or in varying proportions, with the following facts in mind: The granulated slag has a somewhat higher density than desired but it has comparatively great strength. Where great strength is desired and where an increase in weight is not objectionable, the proportion of granulated slag might be increased. On the other hand if the lightest weight possible is desired and a slight decrease in strength is permissible, the percentage of rock sponge might be increased. My aggregate can be controlled to have a density of from 25 pounds to 75 pounds per cubic foot of volume. The material produced in this manner is neutral or slightly alkaline in its reaction and has no deleterious effect on metals, such as reinforcing steel.

In operation the material may be used as a concrete aggregate in proportions which will suggest themselves to those skilled in the art in view of the above disclosure.

I claim:

1. The method of producing a light weight concrete aggregate, which comprises cooling the molten slag with water, regulating the supply of water so that the occluded gases will have time to form bubbles and expand the slag, but bringing the temperature below the melting point before the bubbles have time to join and permit the gases to escape, reducing the product to small particles, and then reheating the particles to a temperature just below the melting point of the material.

2. The method of producing a light weight aggregate which comprises cooling a quantity of molten slag by exposing it to water and thereby reducing it to small solidified particles, mixing said particles with a small amount of fuel containing a certain amount of cinder and burning out the fuel to fuse the cinder into the surface of said particles, and keeping the temperature below the melting point.

3. A light weight concrete aggregate comprising a mixture of substantially equal parts of rock sponge and granulated slag and a smaller part of cinder fused into the surfaces of the individual particles.

4. A light weight concrete aggregate comprising particles of rock sponge and particles of granulated slag sintered together.

5. The method of producing a concrete aggregate which comprises subjecting particles of rock sponge to sufficient heat to cause sintering but not complete fusion.

6. The method of producing a concrete aggregate which comprises subjecting particles of granulated slag to sufficient heat to cause sintering but not complete fusion.

7. The method of producing a light weight aggregate which comprises applying water to molten slag to simultaneously cool it and reduce it to small particles and reheating said particles to a temperature just below the melting point.

8. The method of producing a concrete aggregate which comprises applying a stream of water to a stream of molten slag, the amount of water applied being just that amount which will be turned into steam upon contact with the slag, draining and reheating the resulting particles to a point just below the melting temperature.

9. The method of producing a light weight aggregate which comprises rapidly cooling molten slag, reheating it nearly to the melting point and gradually recooling it.

CARRELL W. BOWYER.